M. C. BIGNALL.
Chain-Pump Bucket.
No. 223,104.  Patented Dec. 30, 1879.
Fig. 1.
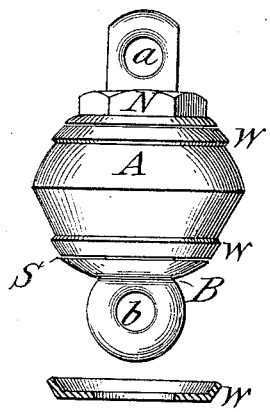
Fig. 2.
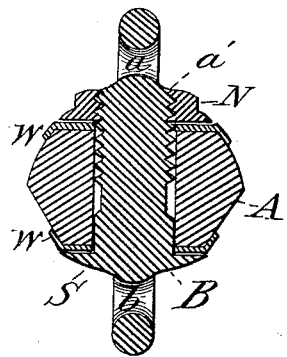
Fig. 3.
Attest:
Ernest Bignall.
M. F. Keeler.
Inventor:
Moses C. Bignall

UNITED STATES PATENT OFFICE.

MOSES C. BIGNALL, OF ST. LOUIS, MISSOURI.

IMPROVEMENT IN CHAIN-PUMP BUCKETS.

Specification forming part of Letters Patent No. 223,104, dated December 30, 1879; application filed August 6, 1879.

*To all whom it may concern:*

Be it known that I, MOSES C. BIGNALL, of the city of St. Louis and State of Missouri, have invented a new and useful Improvement in Valves or Buckets for Chain-Pumps, which improvement is fully set forth in the following specification and accompanying drawings, in which latter—

Figure 1 is an elevation of my improved pump-valve. Fig. 2 is a cross-section of the cup-shaped washer. Fig. 3 is a central longitudinal section of my improved pump-valve.

The nature of my invention consists in a chain-pump valve or bucket the india-rubber packing portion of which is formed of one segment of a prolate spheroid and an inverted frustum of a cone of equal diameters, having a longitudinal perforation for the stem, and united in one homogeneous piece at their bases or largest diameters, thus forming a sharp and elastic bearing-edge. The lower portion acts as an abutment to the upper portion when compression takes place, thus causing a lateral expansion all around at right angles to the central perforation of the rubber packing, and at the same time preserving a sharp bearing-edge where the packing comes in contact with the walls of the pump-tube, and hence can be easily worked. I also use two cup-shaped metallic washers or ferrules having their sides or edges flared or turned up, so that they exactly coincide with and overlie the convex and conical-shaped ends of the packing-piece, thereby securing them from displacement and lateral expansion at the ends while compressing the rubber packing.

B in the accompanying drawings represents an ordinary stem of a chain-pump valve. It is made with eyes $a$ and $b$, and provided with a flanged seat, S, for the washer W, a screw-thread, $a'$, and flanged nut N, whereby the said rubber packing is confined in position and expanded as occasion requires.

The rubber packing-piece A is formed with its upper portion in the form of a segment or bisected frustum of a prolate spheroid, thus presenting a convex surface that will readily and easily pass obstructions and inequalities in the walls of the pump-tube, and avoid being wedged in, which often happens when broad flat bearing-edges are presented to the walls of the pump-tube.

The lower portion of the packing-piece consists of an inverted frustum of a cone, the largest diameter or base of which is of equal diameter with the upper section, and united with it in the manufacture in one homogeneous piece having a vertical central perforation for the stem B.

The object of this conic frustum is to form an abutment of such shape and angles as to press against the upper portion in such a manner as to completely equalize or balance the downward pressure of the upper portion during compression, and thus cause a lateral expansion of the frusta at their point of union or outer edges, said expansion being at right angles to their central perforation.

It has been found after repeated trials that these two forms united in one piece, as described, produce this desired result in the most satisfactory manner.

The cup-shaped washers or ferrules are very essential, as they serve to protect the rubber packing from wear, and at the same time overlap and inclose the ends in such a manner as to prevent them from spreading out laterally, and also hold the said packing so firmly that it cannot be turned upon the stem in case it becomes fastened to the walls of the pump-tube by frost or otherwise.

I am aware of the patent to Churchill, No. 178,753, which shows a packing-core composed of two pieces, the upper of which overlaps the lower, and having a diaphragm to form a central bracing, and to such I make no claim.

I am also aware of the patent to Phelps, No. 185,350, in which is shown a solid packing piece or core formed spherical on one side and with an annular flute on the other. This does not possess the advantages which I claim for the packing-piece of my bucket, for the reason that the angle formed by the annular flute and the sphere-frustum yields too readily to an obstruction, and is liable to be jammed when the pump is in operation. In my bucket the packing-piece, being conical in its lower half, together with the cup-shaped washer in which it rests, forms a solid abutment and suitable angle to resist an unequal downward pressure of the upper portion.

Having thus described my invention, what I claim as new, and desire to secure by Letters Patent, is—

The solid rubber packing-piece A, having its upper half in the form of a sphere-frustum and its lower half in the form of a cone-frustum, in combination with washers W, conforming to the upper and lower ends of said packing-piece, stem B, with flanged seat S, and compression-nut N, as and for the purpose set forth.

MOSES C. BIGNALL.

Witnesses:
ERNEST BIGNALL,
M. F. KEELER.